US011915890B2

(12) United States Patent
Huang

(10) Patent No.: US 11,915,890 B2
(45) Date of Patent: Feb. 27, 2024

(54) ELECTRIC DRILL

(71) Applicant: Globe (Jiangsu) Co., Ltd, Jiangsu (CN)

(72) Inventor: Fei Huang, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 562 days.

(21) Appl. No.: 17/125,939

(22) Filed: Dec. 17, 2020

(65) Prior Publication Data

US 2021/0193413 A1 Jun. 24, 2021

(30) Foreign Application Priority Data

Dec. 19, 2019 (CN) ........................ 201911317292.0

(51) Int. Cl.
*H01H 21/24* (2006.01)
*E21B 11/00* (2006.01)

(52) U.S. Cl.
CPC ........... *H01H 21/24* (2013.01); *E21B 11/005* (2013.01); *H01H 2221/044* (2013.01); *H01H 2221/052* (2013.01); *H01H 2231/048* (2013.01); *H01H 2239/03* (2013.01)

(58) Field of Classification Search
CPC ............. H01H 21/24; H01H 2221/044; H01H 2221/052; H01H 2231/048; H01H 2239/03; H01H 9/06; E21B 11/005
See application file for complete search history.

(56) References Cited

U.S. PATENT DOCUMENTS 4,198,721 A 4/1980 Copeland
4,879,438 A 11/1989 Winchester
5,953,781 A 9/1999 Sletten, II et al.
2009/0145520 A1* 6/2009 Opsitos, Jr. ............. B23B 45/02 144/365
2010/0236800 A1* 9/2010 Watanabe ............ B25D 17/043 173/162.2
2020/0053959 A1* 2/2020 Honglei ................. A01D 34/90

FOREIGN PATENT DOCUMENTS

CN 108799464 A 11/2018
CN 108807040 A 11/2018
EP 2233251 A2 9/2010
EP 2732925 A1 5/2014

OTHER PUBLICATIONS

Extended European Search Report of counterpart European Patent Application No. 20214626.2 dated Apr. 28, 2021.

* cited by examiner

*Primary Examiner* — Carib A Oquendo

(57) ABSTRACT

The invention provides an electric drill including a bracket with a handle, a drill rod, a motor assembly, and a switch assembly. The switch assembly includes a first micro switch configured to activate or deactivate the motor assembly, a switch pivotably mounted on the handle through a pivot and cooperating with the first micro switch, and a self-locking button engaged with the switch and configured as: when the self-locking button is in a first state, the self-locking button abuts against the switch to prevent the switch from rotating around the pivot; when the self-locking button is in a second state, the self-locking button is disengaged with the switch, and the switch can rotate around the pivot.

16 Claims, 13 Drawing Sheets

ELECTRIC DRILL

CROSS-REFERENCE TO RELATED INVENTIONS

This invention claims the priority of CN application Serial No. 201911317292.0, filed on Dec. 19, 2019, the disclosures of which are hereby incorporated by reference in their entirety.

TECHNICAL FIELD

The present invention relates to a power tool, and particularly to an electric drill.

BACKGROUND ART

Ground drills are widely used in seedling landscaping projects on sandy and hard soil for digging holes. The conventional drills use a two-stroke or four-stroke gasoline engine as the power source, which is easy to access and makes the drill work long hours. However, the vibration and noise of gasoline engine usually makes the operators unbearable, and professional workers are more likely to get occupational diseases after long-term use. Moreover, two-stroke or four-stroke gasoline engines have low energy efficiency, and burning fuels will inevitably generate pollutants. In general, the use of gasoline engines is unfriendly to humans and the environment.

Considering the mobility and the working efficiency, DC electric drill with electric motor powered by batteries becomes more popular in the market. Unlike the gasoline engine ground drill with operation by pulling the engine control member, the DC electric drill can be activated or deactivated by pressing the switch button, which makes the operation more convenient. However, the normal switch button structure may bring the safety issue of inadvertent actuation of the drill.

In view of the above, there is a need to provide an improved electric drill to solve the problems.

SUMMARY OF INVENTION

The objective of the present invention is to provide an electric drill which is provided with a self-locking button so that the electric drill can be started only when the switch and the self-locking button are triggered at the same time, thereby improving the safety performance of the electric drill.

In order to achieve the object, the present invention provides an electric drill, comprising: a bracket having a handle; a drill rod; a motor assembly mounted on the bracket for driving the drill rod to rotate; and a switch assembly mounted on the handle; wherein, the switch assembly comprises: a first micro switch configured to activate or deactivate the motor assembly; a switch pivotably mounted on the handle through a pivot, and cooperating with the first micro switch; and a self-locking button engaged with the switch and configured as: when the self-locking button is in a first state, the self-locking button abuts against the switch to prevent the switch from rotating around the pivot; when the self-locking button is in a second state, the self-locking button is disengaged with the switch, and the switch can rotate around the pivot.

As a further improvement of the invention, an abutting arm is arranged on a side of the self-locking button facing the switch, and a receiving groove is arranged on a side of the switch facing the self-locking button; wherein when the self-locking button is in the first state, the abutting arm and the receiving groove are misaligned, and the abutting arm abuts against the switch; and wherein when the self-locking button is in the second state, the abutting arm and the receiving groove are in alignment.

As a further improvement of the invention, a moving direction of the self-locking button from the first state to the second state is parallel to or perpendicular to an axial direction of the pivot.

As a further improvement of the invention, a through hole is arranged on a side of the handle facing the motor assembly, and wherein the self-locking button is partially protruded from the through hole.

As a further improvement of the invention, the switch assembly comprises a switch reset elastic element for resetting the switch, and wherein one end of the switch reset elastic element abuts against the handle and the other end thereof abuts against the switch.

As a further improvement of the invention, the switch assembly comprises a self-locking button reset elastic element for resetting the self-locking button, and wherein one end of the self-locking button reset elastic element abuts against the self-locking button, and the other end thereof abuts against the handle.

As a further improvement of the invention, the switch assembly further comprises a self-locking button reset elastic element for resetting the self-locking button under the action of the self-locking button reset elastic element.

As a further improvement of the invention, the electric drill further comprises a reversing assembly, wherein the reversing assembly comprises a second micro switch and a reversing button cooperating with the second micro switch; and wherein the second micro switch is configured as: the motor assembly reverses only when the first micro switch and the second micro switch are both triggered simultaneously.

As a further improvement of the invention, the handle comprises a first handle and a second handle disposed opposite to each other; and wherein the switch assembly is arranged on the first handle and the reversing assembly is arranged on the second handle.

As a further improvement of the invention, the second handle comprises a groove for accommodating the reversing button; and wherein the reversing button partially protrudes from the groove in a direction facing the motor assembly.

As a further improvement of the invention, the bracket includes a mounting portion for mounting the motor assembly, an operating portion located at the periphery of the mounting portion, and a connecting portion connecting the mounting portion and the operating portion.

As a further improvement of the invention, at least one illumination lamp is positioned on a side of the operation portion facing the drill rod.

As a further improvement of the invention, the operation portion is rectangular, and wherein the at least one illumination lamp is located at a corner of the operation portion.

As a further improvement of the invention, the electric drill further comprises an illumination lamp, wherein the illumination lamp is turned on when the first micro switch is triggered.

As a further improvement of the invention, the electric drill further comprises a transmission mechanism, wherein the transmission mechanism engages with the drill rod and the motor assembly, wherein the transmission mechanism comprises a gear assembly and a gear box for accommodating the gear assembly; wherein the gear box includes a first rotation stopper, and wherein the bracket comprises a second rotation stopper that cooperates with the first rotation stopper to transmit the force received by the gear box to the bracket.

As a further improvement of the invention, the gear box comprises a box body and a cover matched with the box body, and wherein the box body and the box cover are respectively located on opposite sides of the bracket.

As a further improvement of the invention, the first rotation stopper comprises a first positioning member disposed on an end of the box body close to the bracket; and the second rotation stopper comprises a second positioning member arranged on a side of the bracket facing the box body; and wherein the second positioning member engages with the first positioning member.

As a further improvement of the invention, the first rotation stopper comprises a first fixing member disposed on a side of the box cover facing the bracket; and the second rotation stopper comprises a second fixing member arranged on a side of the bracket facing the box cover; and wherein the second fixing member engages with the first fixing member.

The beneficial effect of the present invention is that: the electric drill of the present invention is provided with a self-locking button so that the electric drill can be started only when the switch and the self-locking button are triggered at the same time, thereby improving the safety performance of the electric drill.

The above general description and the following detailed description are intended to be illustrative and not restrictive.

DESCRIPTION OF EMBODIMENT

Figure 1:
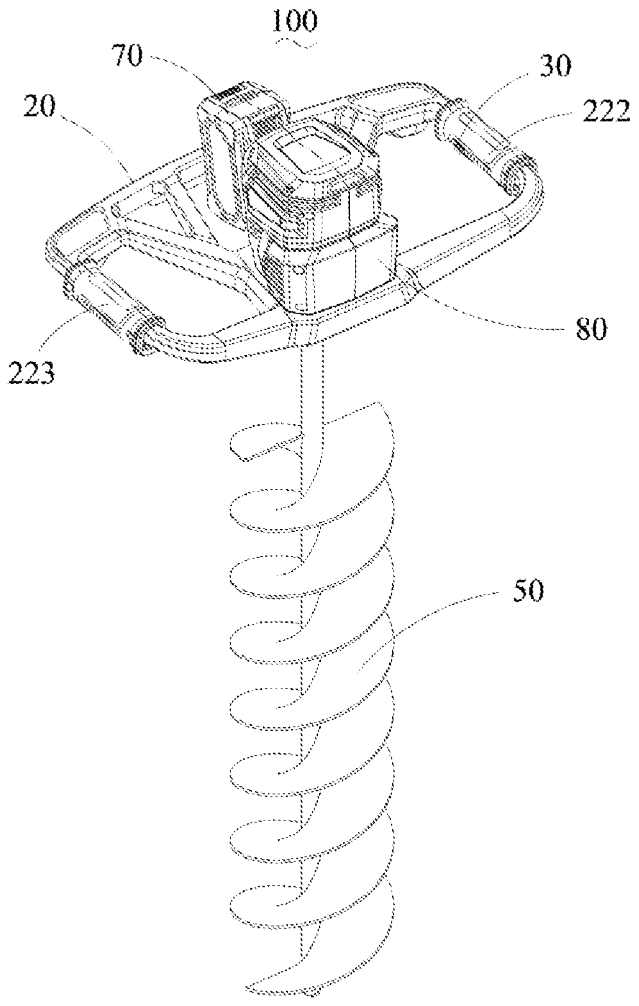
FIG. 1 is a perspective view of an electric drill of the present invention.

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines, and methods consistent with some aspects of the invention as detailed in the appended claims.

Reference will now be made to the drawing figures to describe the embodiments of the present disclosure in detail. In the following description, the same drawing reference numerals are used for the same elements in different drawings.

Figure 2:
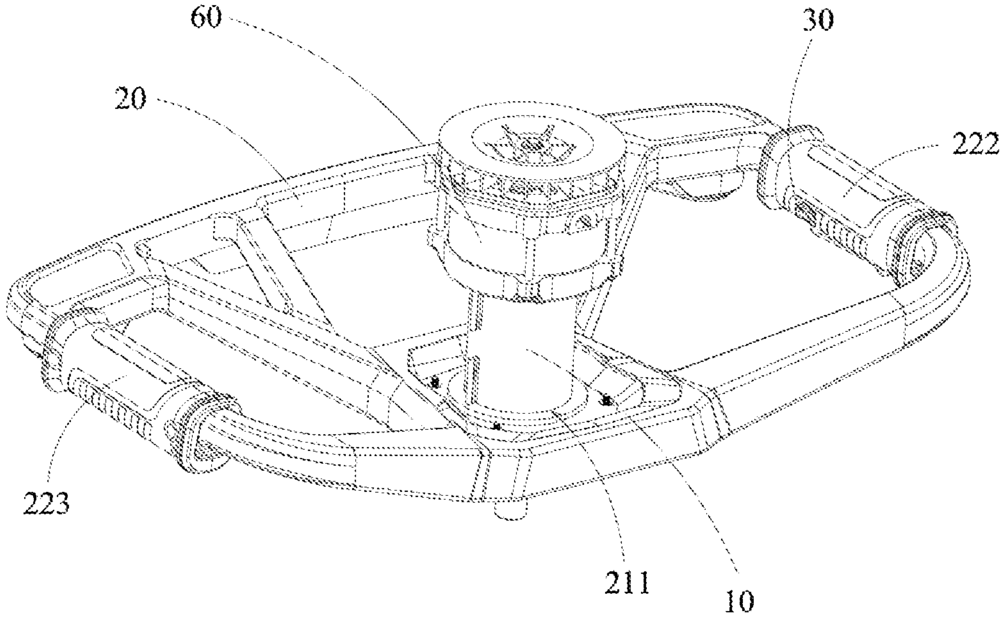
FIG. 2 is a schematic view showing the engagement between a bracket, a motor assembly and a transmission mechanism.
Figure 9:
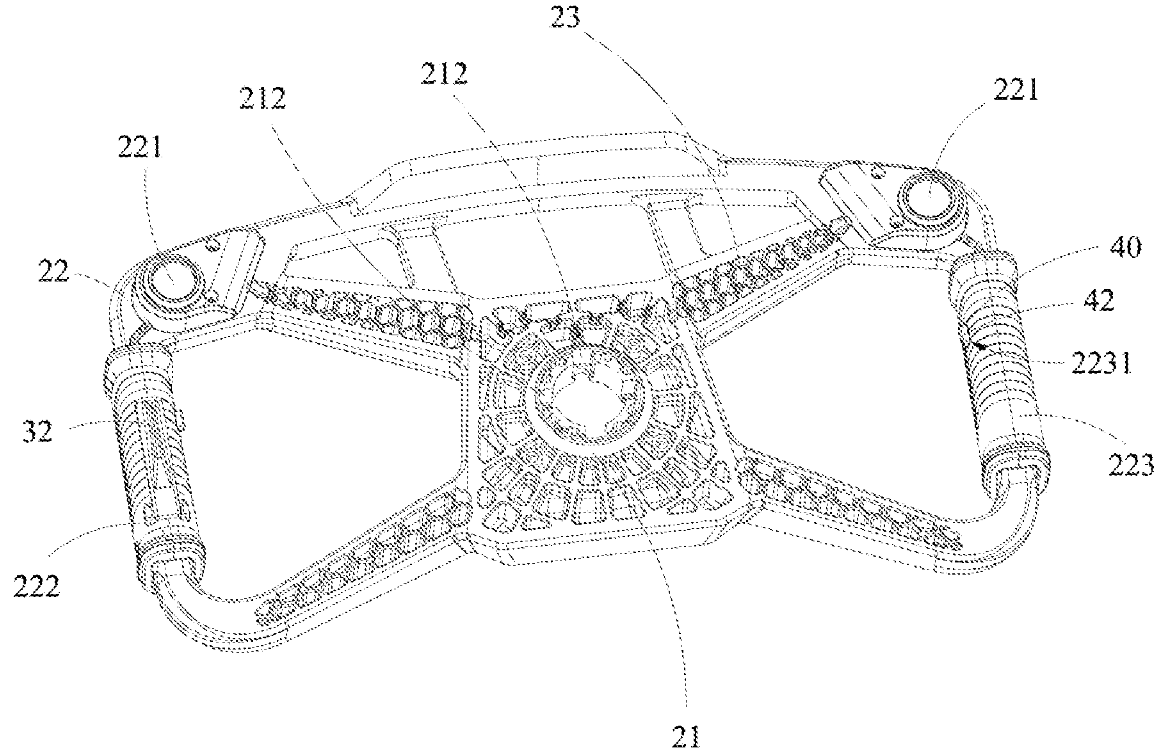
FIG. 9 is a perspective view of the bracket taken from another aspect.

Referring to FIG. 1 and FIG. 2, the present invention discloses an electric drill 100, including a drill rod 50, a motor assembly 60, a battery pack 70 that provides power to the motor assembly 60, a transmission mechanism 10, a bracket 20, a switch assembly 30, and a reversing assembly 40 (as shown in FIG. 9). The drill rod 50 is an operating mechanism for performing the functions of the electric drill 100. The motor assembly 60 drives the drill rod 50 to rotate through the transmission mechanism 10.

Figure 3:
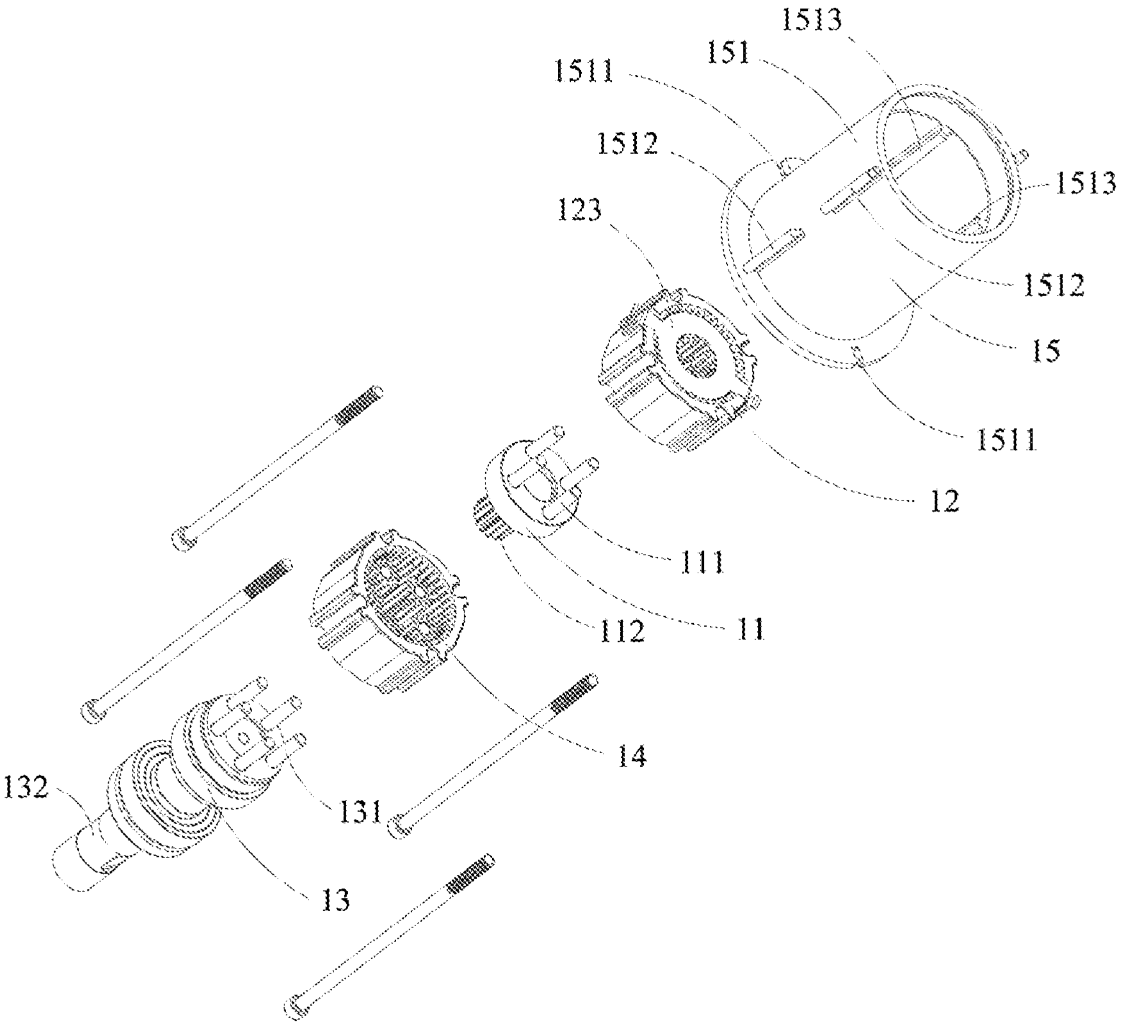
FIG. 3 is an exploded, perspective view of the transmission mechanism.
Figure 4:
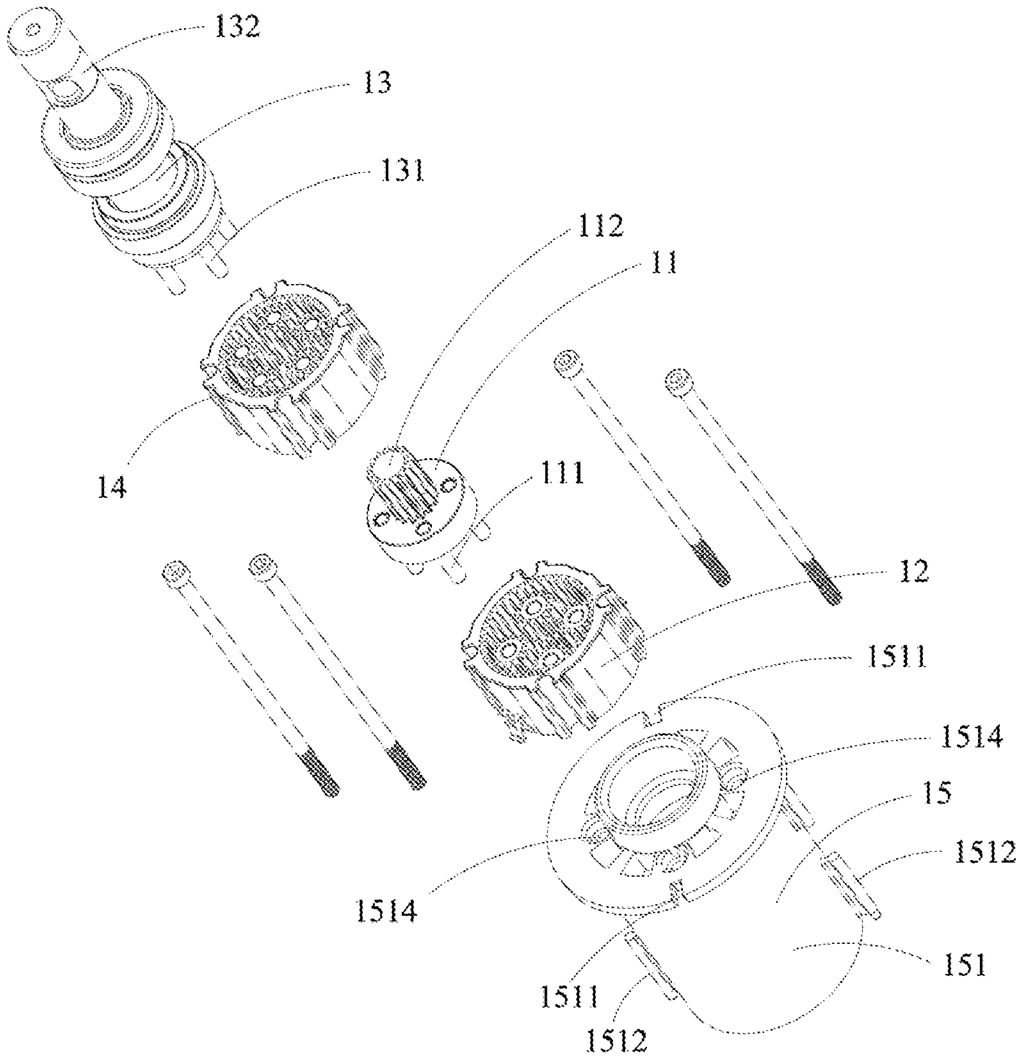
FIG. 4 is an exploded, perspective view of the transmission mechanism taken from another aspect.

Referring to FIG. 3, FIG. 4 and FIG. 2, the transmission mechanism 10 cooperates with the drill rod 50 and the motor assembly 60 so as to transmit the power output by the motor assembly 60 to the drill rod 50. The transmission mechanism 10 includes a gear assembly and a gear box 15 accommodating the gear assembly. The gear assembly includes a primary planet carrier 11, a primary gear assembly 12, a secondary planet carrier 13 and a secondary gear assembly 14. One end of the primary planet carrier 11 comprises a plurality of primary planetary shafts 111 engaged with the primary gear assembly 12, and the other end comprises a sun gear 112 engaged with the secondary gear assembly 14.

Figure 5:
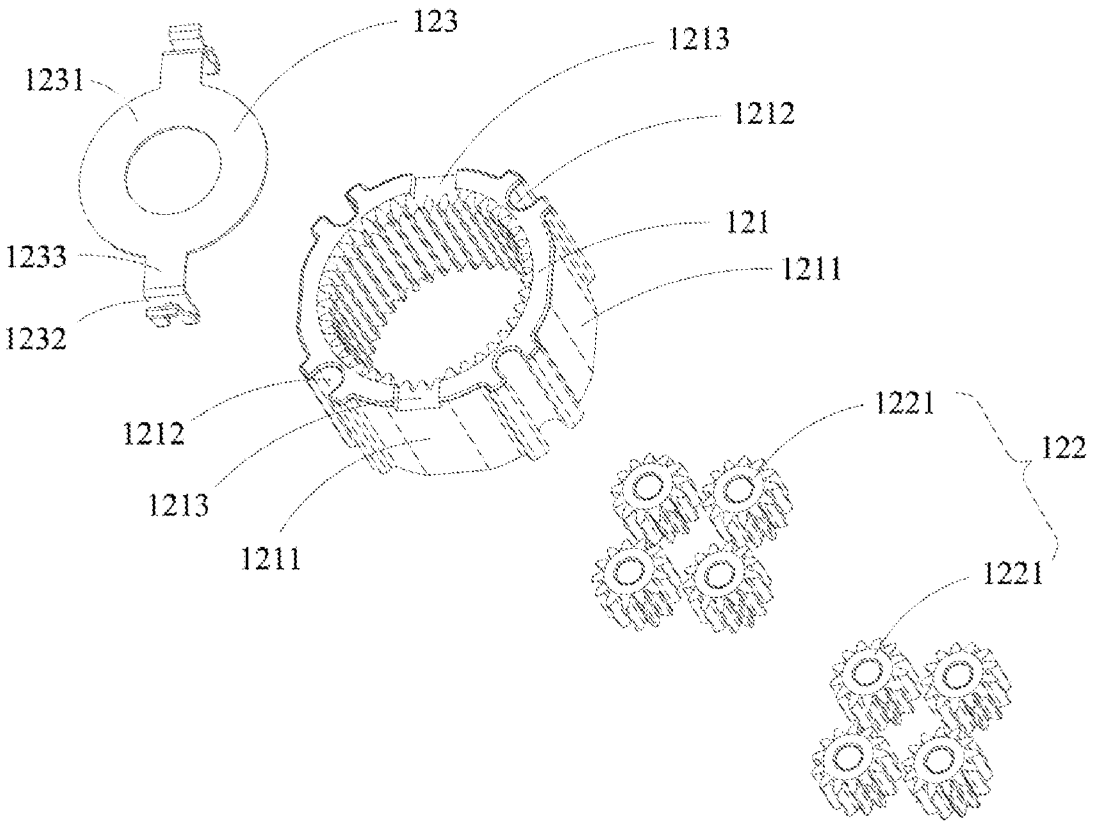
FIG. 5 is an exploded, perspective view of a primary gear assembly.

Referring to FIG. 5, the primary gear assembly 12 includes a primary ring gear 121, a primary gear set 122 located in the primary ring gear 121, and a fixing plate 123. A side wall of the primary gear 121 facing away from the primary gear set 122 comprises flat walls 1211 and a fixing portion 1212 located between the adjacent flat walls 1211. The fixing portion 1212 extends throughout the thickness of the primary ring gear 121 along the axial direction of the primary ring gear 121. The fixing portion 1212 comprises a slot on a side facing a side wall of the gear box 15, and the fixing portion 1212 is configured as a semi-circular portion. An end of the primary ring gear 121 away from the secondary gear assembly 14 comprises a retaining groove 1213. The primary gear set 122 includes at least two groups of primary planetary gear set 1221. The at least two primary planetary gear sets 1221 are overlapped in the axial direction of the primary ring gear 121, and are pivotably mounted on the primary planetary gear shaft 111, and the outer side of the primary planetary gear set 1221 engages with the primary ring gear 121 and the inner side thereof engages with a central gear (not shown) arranged on the output shaft of the motor assembly 60. Each group of the primary planetary gear set 1221 includes four planetary gears, and the four planetary gears are evenly distributed on the peripheral edge of the primary ring gear 121 along the axial direction. In this embodiment, the number of the primary planetary gear set 1221 is two, and each set of the primary planetary gear set 1221 includes four gears, but in other embodiments, the number of the primary planetary gear set 1221 (≥2) and the number of gears contained in each group of the primary planetary gear set 1221 can be arranged as required. Since the primary gear set 122 comprises at least two primary planetary gear sets 1221, the load carried by the primary gear set 122 is relatively uniform, so that the primary planet carrier 11 can withstand a larger load, and can output a stable force. Moreover, the service life of the transmission mechanism 10 can be extended due to the uniform load carried by the primary gear set 122. The fixing plate 123 is located at an end of the primary gear assembly 12 away from the secondary gear assembly 14 to limit the primary planetary gear set 1221 within the primary ring gear 121. The fixing plate 123 includes a main body 1231, an elastic resisting portion 1232 extending from the main body 1231, and a connecting portion 1233 connecting the main body 1231 and the elastic resisting portion 1232. The main body 1231 has an annular shape. The connecting portion 1233 is accommodated in the retaining groove 1213, and the elastic resisting portion 1232 is bend and substantially V-shaped. One end of the elastic resisting portion 1232 facing away from the connecting portion 1233 elastically resists the side wall of the gear box 15, so as to secure the fixing plate 123 in the primary gear assembly 12.

Figure 6:
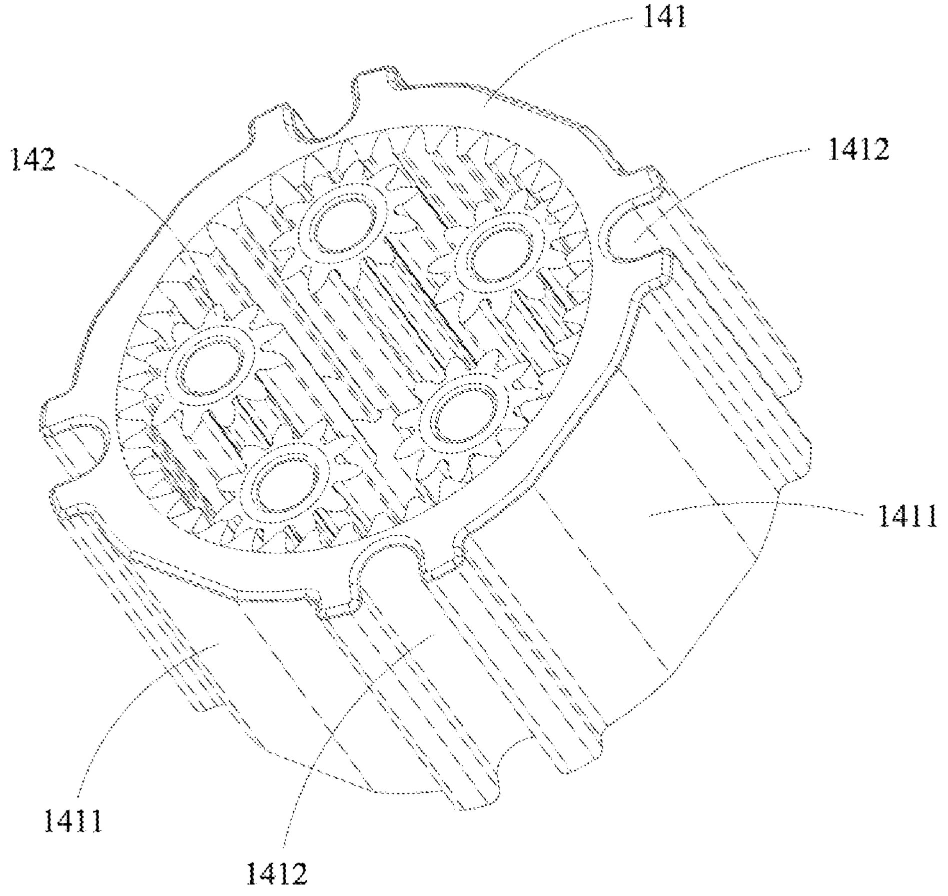
FIG. 6 is a perspective view of a secondary gear assembly.
Figure 7:
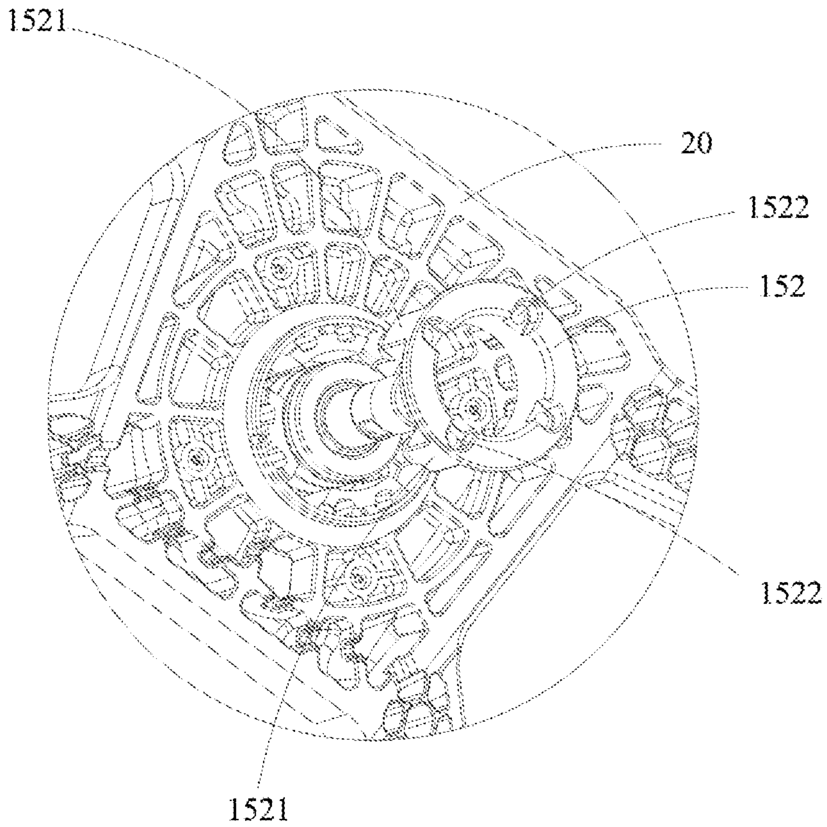
FIG. 7 is a partial enlarged, exploded perspective view of a box cover and the bracket.

Referring to FIGS. 3 and 4, one end of the secondary planetary carrier 13 is provided with a plurality of secondary planetary gear shafts 131 engaged with the secondary gear assembly 14, and the other end is provided with an output shaft 132 engaged with the drill rod 50. Referring to FIG. 6, the secondary gear assembly 14 includes a secondary gear ring 141 and a secondary planetary gear set 142 located in the secondary gear ring 141. A side wall of the secondary ring gear 141 facing away from the secondary planetary gear set 142 comprises a flat wall 1411 and a fixing portion 1412 located between the adjacent flat walls 1411. The fixing portion 1412 extends throughout the thickness of the secondary gear 141 along the axial direction of the secondary gear 141. The fixing portion 1412 comprises a slot on a side facing the side wall of the gear box 15, and the fixing portion 1412 is a configured as a semi-circular slot. The secondary planet gear set 142 is pivotably arranged on the secondary planet gear shaft 131, and the outer side of the secondary planet gear set 142 engages with the secondary ring gear 141 and the inner side thereof engages with the sun gear 112. In this embodiment, the secondary planet gear set 142 includes five gears, but in other embodiments, the number of the gears of the secondary planet gear set 142 can be configurable according to the requirements without limitation. Referring together to FIGS. 3, 4 and 7, the gear box 15 accommodates the primary planet carrier 11, the primary gear assembly 12, the secondary planet carrier 13 and the secondary gear assembly 14, and includes a box body 151 and a box cover 152 matched with the box body 151. The box body 151 and the box cover 152 are respectively located on opposite sides of the bracket 20. The gear box 15 includes a first rotation stopper comprising a first positioning member 1511 disposed on an end of the box body 151 close to the bracket 20 and a first fixing member 1521 disposed on a side of the box cover 152 facing the bracket 20. The box body 151 includes a first resist member 1512 on a sidewall thereof facing away from the gear assembly. A side wall of the box body 151 facing the gear assembly also includes positioning ribs 1513 being in cooperating with the flat wall 1211 and the flat wall 1411. Since the contact surfaces of the flat walls 1211, 1411 and the positioning rib 1513 are flat, the contact area between the box body 151 and the primary gear ring 121 and the secondary gear ring 141 can be effectively increased, and this also makes it easy to assemble the gear box 15, the primary gear ring 121, and the secondary gear ring 141. In the present embodiment, the number of the positioning rib 1513 is four, and they are evenly arranged on the side wall of the box body 151. The numbers of the flat walls 1211, 1411 are both four, and they are evenly arranged on side walls of the primary gear ring 121, the secondary gear ring 141, respectively. In other embodiments, the numbers of the positioning rib 1513, the flat walls 1211, 1411 can be determined according to the requirements without limitation. The box body 151 also includes a box assembling hole 1514 engaging with the fixing portion 1212 and the fixing portion 1412. The box cover 152 has a cover assembling hole 1522. The cover assembling hole 1522, the box assembling hole 1514, the fixing portion 1212 and the fixing portion 1412 engage with each other through a screw, thereby fixing the box body 151, the gear assembly, the box cover 152 together.

Figure 8:
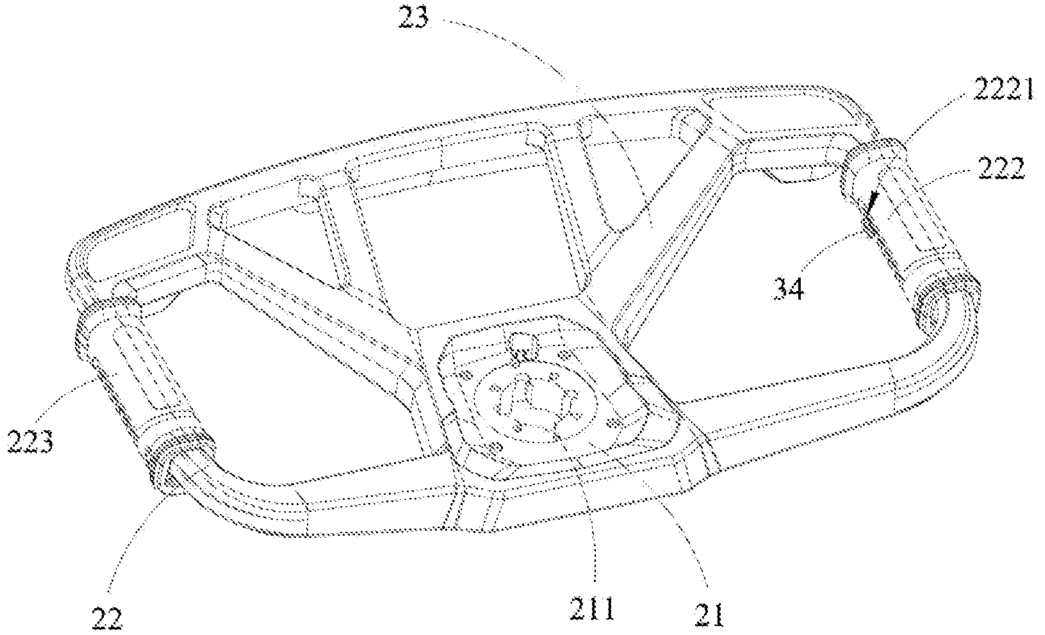
FIG. 8 is a perspective view of the bracket.

Referring to FIGS. 8, 9 and FIG. 7, the bracket 20 includes a mounting portion 21, an operating portion 22 located at the periphery of the mounting portion 21, and a connecting portion 23 connecting the mounting portion 21 and the operating portion 22. The motor assembly 60 and the transmission mechanism 10 are mounted on the mounting portion 21. The mounting portion 21 includes a second rotation stopper that cooperates with the first rotation stopper to transmit the force received by the gear box 15 to the bracket 20. The second rotation stopper includes a second positioning member 211 arranged on a side of the mounting portion 21 facing the box body 151, and a second fixing member 212 arranged on the side of the mounting portion 21 facing the box cover 152. The second positioning member 211 engages with the first positioning member 1511, and the second fixing member 212 engages with the first fixing member 1521, so that the force received by the gear box 15 can be transmitted to the bracket 20 through the first positioning member 1511, the second positioning member 211, the first fixing member 1521, and the second fixing member 212, thereby effectively preventing connection between the gear box 15 and the bracket 20 from loosening. In the present embodiment, the first positioning member 1511 is a positioning recess, and the second positioning member 211 is a positioning protrusion, while in other embodiments, the first positioning member 1511 may also be a positioning protrusion, and the second positioning member 211 can also be a positioning recess matching with the positioning protrusion. In the present embodiment, the first fixing member 1521 is a protrusion extending downwards from the box cover 152, and the second fixing member 212 is a recess matching with the protrusion. The cover assembling hole 1522 is located on the first fixing member 1521.

Figure 10:
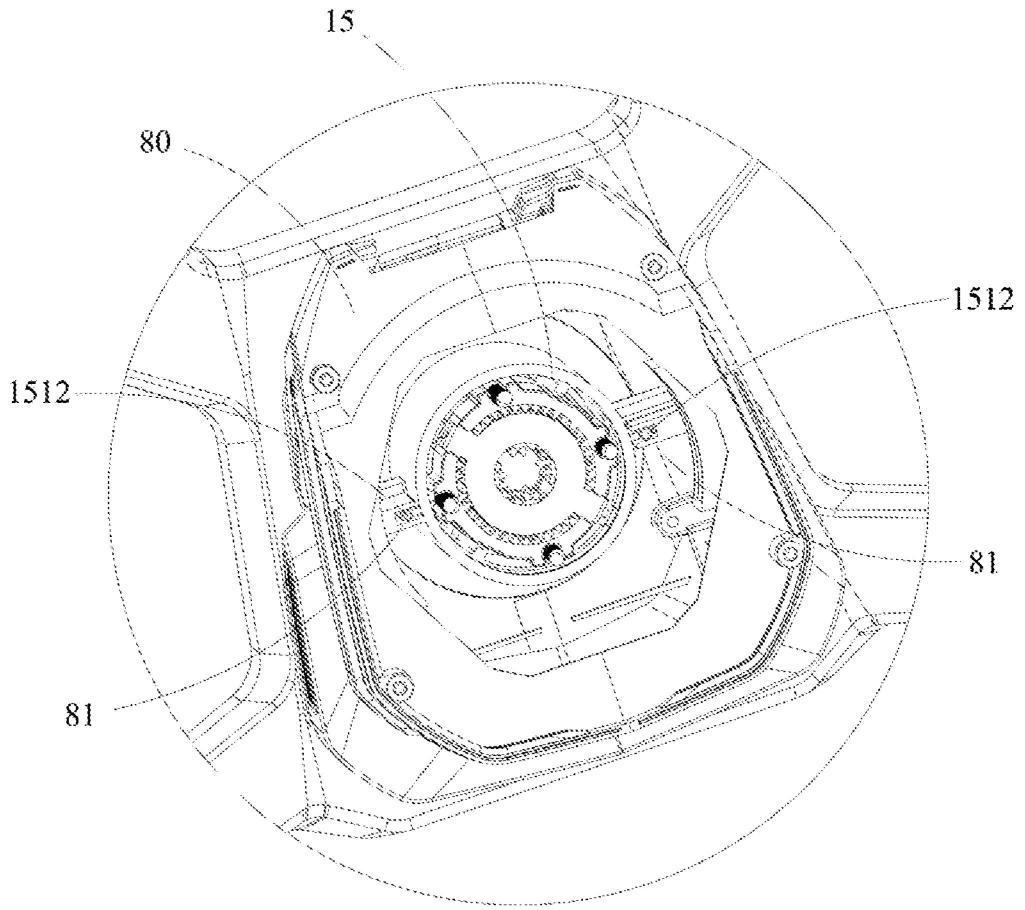
FIG. 10 is a schematic view showing the engagement between the bracket, the transmission mechanism and a shell without top wall.

Referring to FIG. 10 and FIG. 1, the electric drill 100 also includes a shell 80 securely assembled on the bracket 20. The motor assembly 60 and the transmission mechanism 10 are received in the shell 80. A inner side wall of the shell 80 has a second resist member 81 matched with the first resist member 1512. This arrangement makes that the force applied to the gear box 15 can be transmitted to the shell 80 through the first resist member 1512 and the second resist member 81, and indirectly transmitted to the bracket 20, thereby a loosening phenomenon between the gear box 15 and the bracket 20 can be effectively prevented, thus the user experience is effectively improved. In the present embodiment, the first resist member 1512 is a protrusion, and the second resist member 81 is a recess engaging with the protrusion, while in other embodiments, the first resist member 1512 may also be a recess and the second resist member 81 may be a protrusion. The operating portion 22 is substantially rectangular, and an illumination lamp 221 is positioned on a side of the operating portion 22 facing the drill rod 50. In this embodiment, the number of the illumination lamps 221 is two, and they are located at one end of the operating portion 22 close to the battery pack 70.

Preferably, the number of the illumination lamps 221 is four, and they are located at four corners of the operating portion 22 respectively. By such an arrangement, a wide range of illumination area can be obtained, and the light emitted by the illumination lamp towards the working area can not be blocked by the drill rod 50, thereby effectively improving the user experience. The operating portion 22 is also provided with a pair of handles, including a first handle 222 and a second handle 223 disposed opposite to each other.

Figure 11:
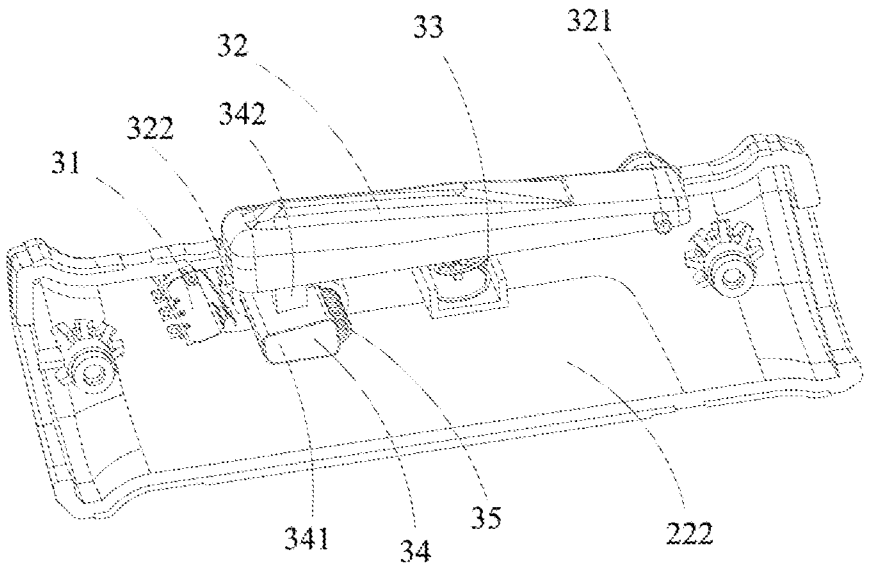
FIG. 11 is a structural schematic view of a switching assembly.
Figure 12:
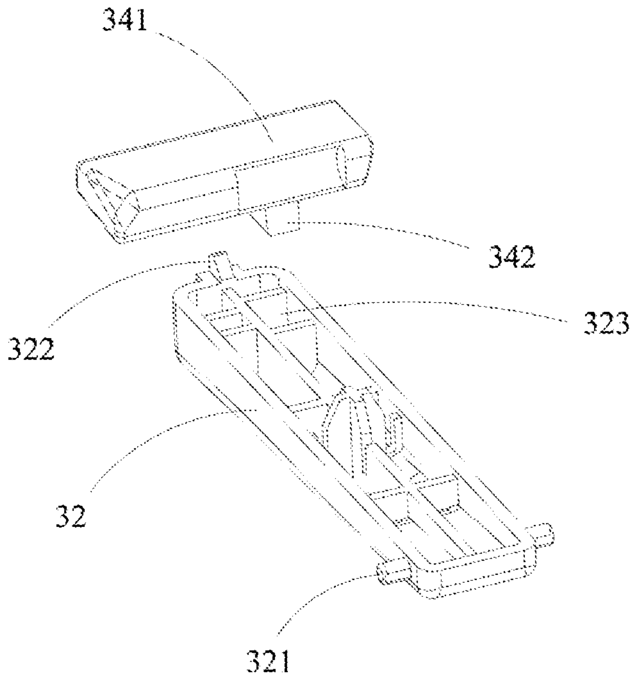
FIG. 12 is a schematic view showing an engagement between a switch and a self-locking button.

Referring to FIG. 11, FIG. 12 and FIG. 1, the switch assembly 30 is assembled on the first handle 222, and includes a first micro switch 31, a switch 32, a switch reset elastic element 33, a self-locking button 34, and a self-locking button reset elastic element 35. The first micro switch 31 is configured to activate or deactivate the motor assembly 60. The switch 32 is pivotably mounted on the handle 222 through a pivot 321, and an end of the switch 32 facing away from the pivot 321 is provided with an abutting block 322 that cooperates with the first micro switch 31. A receiving groove 323 is arranged on a side of the switch 32 facing the self-locking button 34. One end of the switch reset elastic element 33 abuts against the first handle 222 and the other end abuts against the switch 32. The self-locking button 34 includes a base 341 and an abutting arm 342 located on a side of the base 341 facing the switch 32, and the abutting arm 342 is cooperating with the receiving groove 323. One end of the self-locking button reset elastic element 35 abuts against the self-locking button 34, and the other end abuts against the first handle 222. Referring to FIG. 8, a through hole 2221 is arranged on a side of the first handle 222 facing the motor assembly 60, and the self-locking button 34 partially protrudes from the through hole 2221 so as to be pressed by the operator.

The button 34 is configured in such a way that: when the self-locking button 34 is in the first state, the self-locking button 34 abuts against the switch 32 to prevent the switch 32 from rotating around the pivot 321; when the self-locking button 34 is in the second state, the self-locking button 34 is out of contact with the switch 32, and the switch 32 can rotate around the pivot 321. Specifically, when the self-locking button 34 is pressed (i.e., in the second state), the self-locking button reset elastic element 35 is elastically deformed, and the self-locking button 34 moves into the first handle 222 so that the abutting arm 342 and the receiving groove 323 are in alignment. At this time, pressing the switch 32 causes the switch 32 to rotate around the pivot 321. The switch reset elastic element 33 is elastically deformed, and the abutting arm 342 enters into the receiving groove 323, and the abutting block 322 abuts against the first micro switch 31, so that the first micro switch 31 is activated. When the switch 32 is released, the switch 32 is reset under the action of the switch reset elastic element 33; when the self-locking button 34 is released, the self-locking button 34 is reset under the action of the elastic element 35 (i.e., in the first state). At this time, the abutting arm 342 and the receiving groove 323 are misaligned, and the abutting arm 342 abuts against the switch 32, so that the switch 32 cannot rotate around the pivot 321. Therefore, the electric drill 100 of the present invention will not be activated by accidentally touching the switch 32, and a safety operation of the electric drill 100 is achieved. In the present embodiment, the moving direction of the self-locking button 34 from the first state to the second state is parallel to the axial direction of the pivot 321, while in other embodiments, the moving direction from the first state to the second state of the self-locking button 34 may also be configured to be perpendicular to the axial direction of the pivot 321.

Figure 13:
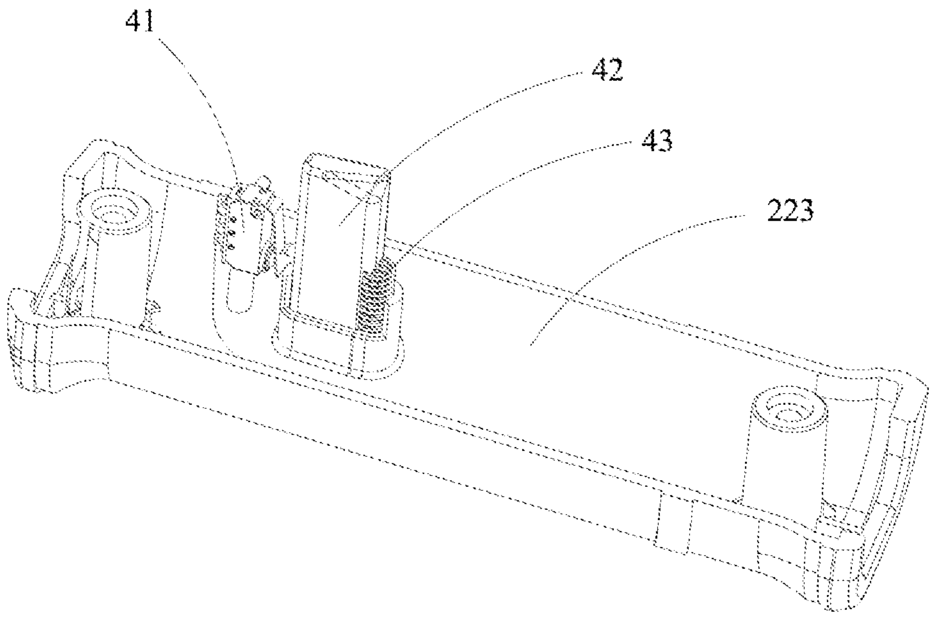
FIG. 13 is a structural schematic view of a reverse assembly.

Referring to FIG. 13 and FIG. 9, the reversing assembly 40 is disposed on the second handle 223, and includes a second micro switch 41, a reversing button 42 engaged with the second micro switch 41, and a reversing button reset elastic element 43. The second handle 223 is provided with a groove 2231 for accommodating the reversing button 42. The reversing button 42 partially protrudes from the groove 2231, and the protruding portion thereof is located on a side of the second handle 223 facing the motor assembly 60. When the reversing button 42 is pressed, the reversing button 42 retracts into the groove 2231, the reversing button reset elastic element 43 is elastically deformed, and the reversing button 42 abuts against the second micro switch 41 so that the second micro switch 41 is triggered. When the reversing button 42 is released, the reversing button 42 is reset under the action of the reversing button reset elastic element 43. In this embodiment, the second micro switch 41 is configured in such a way that: the motor assembly 60 reverses when and only when the first micro switch 31 and the second micro switch 41 are both triggered at the same time. With this arrangement, it is possible to prevent the electric drill 100 from reversing due to accidentally touching the reversing button 42, thereby effectively improving the safety factor. In this embodiment, after any one of the first micro switch 31 and the second micro switch 41 is triggered, the illumination lamp 221 is turned on.

Compared with the prior art, the electric drill 100 of the present invention comprising the self-locking button 34 enables the electric drill 100 to be activated only when the switch 32 and the self-locking button 34 are triggered simultaneously, thereby improving the safety factor of the electric drill 100.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. An electric drill, comprising:

a bracket having a handle;

a drill rod;

a motor assembly mounted on the bracket for driving the drill rod to rotate; and a switch assembly mounted on the handle;

wherein, the switch assembly comprises:

a first micro switch configured to activate or deactivate the motor assembly;

a switch pivotably mounted on the handle through a pivot, and cooperating with the first micro switch; and a self-locking button engaged with the switch and configured as: when the self-locking button is in a first state, the self-locking button abuts against the switch to prevent the switch from rotating around the pivot; when the self-locking button is in a second state, the self-locking button is disengaged with the switch, and the switch can rotate around the pivot;

wherein the electric drill further comprises a reversing assembly, wherein the reversing assembly comprises a second micro switch and a reversing button cooperating with the second micro switch; and wherein the second micro switch is configured as: the motor assembly reverses only when the first micro switch and the second micro switch are both triggered simultaneously.

2. The electric drill of claim 1, wherein an abutting arm is arranged on a side of the self-locking button facing the switch, and a receiving groove is arranged on a side of the switch facing the self-locking button; wherein when the self-locking button is in the first state, the abutting arm and the receiving groove are misaligned, and the abutting arm abuts against the switch; and wherein when the self-locking button is in the second state, the abutting arm and the receiving groove are in alignment.

3. The electric drill of claim 1, wherein a moving direction of the self-locking button from the first state to the second state is parallel to or perpendicular to an axial direction of the pivot.

4. The electric drill of claim 3, wherein a through hole is arranged on a side of the handle facing the motor assembly, and wherein the self-locking button is partially protruded from the through hole.

5. The electric drill of claim 1, wherein the switch assembly comprises a switch reset elastic element for resetting the switch, and wherein one end of the switch reset elastic element abuts against the handle and the other end thereof abuts against the switch.

6. The electric drill of claim 1, wherein the switch assembly comprises a self-locking button reset elastic element for resetting the self-locking button, and wherein one end of the self-locking button reset elastic element abuts against the self-locking button, and the other end thereof abuts against the handle.

7. The electric drill of claim 1, wherein the handle comprises a first handle and a second handle disposed opposite to each other; and wherein the switch assembly is arranged on the first handle and the reversing assembly is arranged on the second handle.

8. The electric drill of claim 7, wherein the second handle comprises a groove for accommodating the reversing button; and wherein the reversing button partially protrudes from the groove in a direction facing the motor assembly.

9. The electric drill of claim 1, wherein the bracket includes a mounting portion for mounting the motor assembly, an operating portion located at the periphery of the mounting portion, and a connecting portion connecting the mounting portion and the operating portion.

10. The electric drill of claim 9, wherein at least one illumination lamp is positioned on a side of the operation portion facing the drill rod.

11. The electric drill of claim 10, wherein the operation portion is rectangular, and wherein the at least one illumination lamp is located at a corner of the operation portion.

12. The electric drill of claim 1, further comprising an illumination lamp, wherein the illumination lamp is turned on when the first micro switch is triggered.

13. An electric drill, comprising:

a bracket having a handle;

a drill rod;

a motor assembly mounted on the bracket for driving the drill rod to rotate; and a switch assembly mounted on the handle;

wherein, the switch assembly comprises:

a first micro switch configured to activate or deactivate the motor assembly;

a switch pivotably mounted on the handle through a pivot, and cooperating with the first micro switch; and a self-locking button engaged with the switch and configured as: when the self-locking button is in a first state, the self-locking button abuts against the switch to prevent the switch from rotating around the pivot; when the self-locking button is in a second state, the self-locking button is disengaged with the switch, and the switch can rotate around the pivot;

the electric drill further comprises a transmission mechanism, wherein the transmission mechanism engages with the drill rod and the motor assembly, wherein the transmission mechanism comprises a gear assembly and a gear box for accommodating the gear assembly; wherein the gear box includes a first rotation stopper, and wherein the bracket comprises a second rotation stopper that cooperates with the first rotation stopper to transmit the force received by the gear box to the bracket.

14. The electric drill of claim 13, wherein the gear box comprises a box body and a cover matched with the box body, and wherein the box body and the box cover are respectively located on opposite sides of the bracket.

15. The electric drill of claim 14, wherein the first rotation stopper comprises a first positioning member disposed on an end of the box body close to the bracket; and the second rotation stopper comprises a second positioning member arranged on a side of the bracket facing the box body; and wherein the second positioning member engages with the first positioning member.

16. The electric drill of claim 14, wherein the first rotation stopper comprises a first fixing member disposed on a side of the box cover facing the bracket; and the second rotation stopper comprises a second fixing member arranged on a side of the bracket facing the box cover; and wherein the second fixing member engages with the first fixing member.

* * * * *